United States Patent [19]

Davis et al.

[11] 4,252,139

[45] Feb. 24, 1981

[54] METHOD AND APPARATUS FOR AUTOMATICALLY MIXING A SOLUTION HAVING A SPECIFIED CONCENTRATION

[75] Inventors: John R. Davis, Donalds; John T. Pollock, Greenwood, both of S.C.

[73] Assignee: Milliken Research Corporation, Spartanburg, S.C.

[21] Appl. No.: 32,470

[22] Filed: Apr. 23, 1979

Related U.S. Application Data

[63] Continuation of Ser. No. 874,022, Feb. 1, 1978, abandoned.

[51] Int. Cl.³ .......................................... G05D 11/13
[52] U.S. Cl. ......................................... 137/3; 137/91; 137/391; 222/64
[58] Field of Search ....................... 137/3, 4, 5, 6, 90, 137/91, 92, 93, 101.25, 101.27, 391, 396; 222/63, 64, 65, 66, 318; 8/82

[56] References Cited

U.S. PATENT DOCUMENTS

| | | | |
|---|---|---|---|
| 3,004,544 | 10/1961 | Guptill, Jr. ........................... | 137/91 |
| 3,074,277 | 1/1963 | Hill ........................................ | 137/3 |
| 3,710,811 | 1/1973 | Leverenz et al. .................... | 137/5 |
| 3,901,724 | 8/1975 | White .................................... | 222/64 |

*Primary Examiner*—William R. Cline
*Assistant Examiner*—H. Jay Spiegel
*Attorney, Agent, or Firm*—Earle R. Marden; H. William Petry

[57] ABSTRACT

A method and apparatus for automatically mixing a solution having a specified concentration is disclosed. The apparatus comprises: a storage tank, means for automatically introducing water into the tank, means for slowly introducing salt into the tank, and means for terminating the introduction of salt into the tank when the specific gravity of the tank reaches a specified value. Means are provided for preventing withdrawal of solution during the mixing cycle. The method includes the steps of: storing salt solution of the desired concentration in a vessel; withdrawing solution from the vessel; adding water to the vessel after the level of solution in the vessel falls below a specified level and after the withdrawal which lowered the level below the specified level is complete; adding salt to the vessel, terminating the addition of salt to the vessel when the specific gravity of the solution reaches a specified value and preventing the initiation of withdrawal of solution from the vessel after the level in the vessel has been lowered below the specified level until the vessel is again filled with solutions having the specified specific gravity. A control circuit for carrying out the method is disclosed.

2 Claims, 2 Drawing Figures

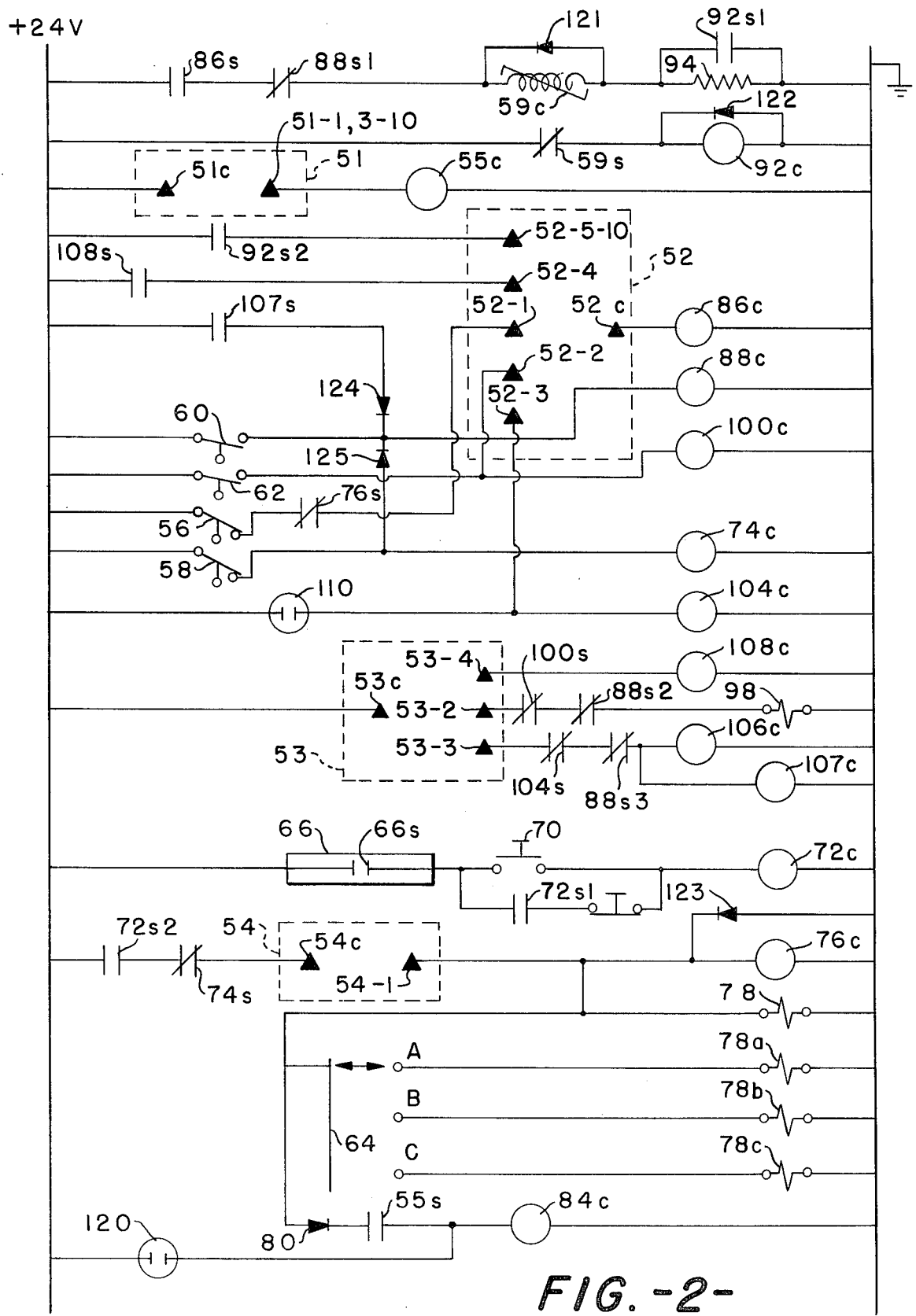
FIG. -2-

METHOD AND APPARATUS FOR AUTOMATICALLY MIXING A SOLUTION HAVING A SPECIFIED CONCENTRATION

This is a continuation of application Ser. No. 874,022, filed Feb. 1, 1978, now abandoned.

Glauber salt is widely used as a leveling agent in the dyeing industry. It is normally added to dye baths by the scoopful or by weight, however, since Glauber salt is so hygroscopic that it will absorb water out of air, weight measurements are normally somewhat inaccurate. This invention is concerned with a method and apparatus for automatically mixing and dispensing solution having an accurate concentration of Glauber salt to a dyeing apparatus. Further, this concentration may be conveniently adjusted for each batch of solution prepared.

BRIEF DESCRIPTION OF THE DRAWINGS

FIG. 2 is a schematic illustrating the control logic of the controller.

In FIG. 1, solutions of about 25% Glauber salt in water is stored in mixing tank 12. Water can be introduced into mixing tank 12 through water inlet pipe 14 controlled by valve 16 which in turn is controlled by controller 18. Glauber salt 20 is stored in bin 22. Upon activation of conveyor 24, salt is transported from bin 22 to mixing tank 12. Pressure transmitters 25 and 27 sense the pressure of two different levels in mixing tank 12 and transmit signals to switches 56, 58, 60, 62 and 110 of controller 18. Controller 18 also controls conveyor 24. Salt solution can be withdrawn from mixing tank 12 via line 26 which is controlled by pump 29 which is controlled by controller 18. Dye mixing tanks 30a, 30b, 30c . . . are connected to main supply line 26 by individual supply lines 32a, 32b, 32c . . . controlled by valves 34a, 34b, 34c . . . . It is of great advantage to arrange the system so that supply lines 32a, 32b, 32c to each tank from main supply line 26 will be as short as possible since lines carrying concentrated solutions of Glauber salt tend to block up if solution is left standing in them for long periods. By arranging the system with very short pipes leading to dye mixing tanks 30a, 30b, 30c . . . , it is possible to prevent these lines from blocking up by intermittently circulating solution through main supply line 26. It is thought that since supply lines 32a, 32b, 32c. . . are very short, circulation in main supply 26 not only keeps it clear but also induces a secondary flow in each supply line 32a, 32b, 32c . . . which helps to minimize blocking up. All lines are kept clear by circulating solution through main supply line 26 for ten (10) minutes every four (4) hours.

Figure 1:
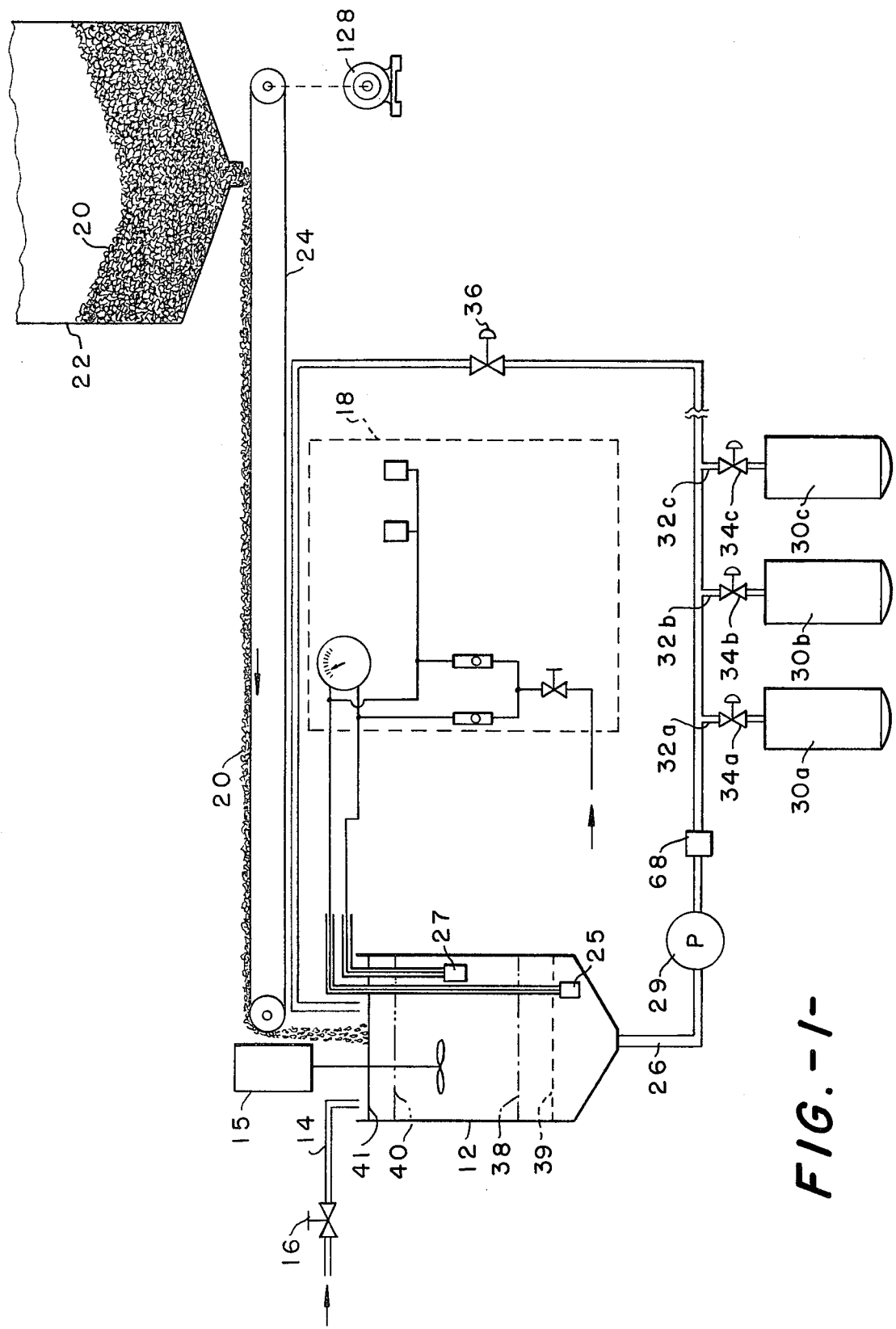
FIG. 1 is a schematic illustrating the physical arrangement of the apparatus.

When salt solution is to be introduced to any mixing tank, for example 30a, valve 34a is opened, valve 36 is closed, and pump 29 is activated thus delivering solution to tank 30a.

If the level of salt solution in mixing tank 12 is between full and a lower level called the batch level indicated at 38, the system is in the normal or first state.

If a delivery to an individual mixing tank should lower the level of salt solution in mixing tank 12 below batch level 38, the signal from pressure sensor 25 activates controller 18 which waits until that delivery is complete and then steps to the second state in which valves 34a, 34b, 34c . . . are kept closed, pump 29 kept off, and valve 16 is opened, causing water at 120° F. to run into mixing tank 12 until the level reaches the water cut off level indicated at 40. At this time, the controller steps to a third state in which valve 16 is closed, pump 29 is kept off, valves 34a, 34b, 34c . . . kept closed and conveyor 24 is on.

As conveyor 24 operates, salt is slowly introduced into mixing tank 12. As the salt goes into solution or suspension, the specific gravity of the solution increases and consequently the difference between the pressure sensed by sensor 25 and sensor 27 increases. When the pressure difference reaches a predetermined value, controller 18 steps to the fourth state. The predetermined value of the pressure difference corresponds to the specific gravity desired for the desired concentration of salt. For example, if a 25% solution of salt in water at 120° F. is desired, the specific gravity of that solution is about 1.125. If pressure sensors 25 and 27 are 30 inches apart, then controller 18 should step to the fourth state when the pressure difference between sensors 26 and 27 is 35.5 inches of water.

When the system is in state 4, valves 34a, 34b, 34c . . . are kept closed and pump 29 kept off. After a short delay for mixing the system returns to state 1 and liquid can again be withdrawn.

If for any reason the level in tank 12 should rise above high alarm level 40 or fall below low level 39 an alarm is sounded and valves 34a, 34b, 34c . . . are disabled so the operator can not dispense liquid. Similarly, if salt conveyor 24 does not shut off within 30 minutes after it starts, the alarm is sounded and the valves are disabled.

The control circuit of controller 18 is shown in FIG. 2. The heart of the system is a conventional commercially available rotary stepper switch shown in FIG. 2 as having a plurality of switch decks 51, 52, 53 and 54. Each deck has a common terminal numbered with a "c" following the number of the deck (for example 51c is the common terminal on deck 51, 52c is the common terminal on deck 52 and so on). The common terminal on each deck may be connected to any one of the plurality of contacts arranged around the periphery of the decks. To facilitate understanding, each contact is numbered with the number of the deck it is on followed by a hyphen and a numeral indicating the position of that contact, for example, contact 51-1 is the first contact on deck 51, 52-10 is the tenth contact on deck 52. All common terminals 51c, 52c, 53c, and 54c are ganged together on a racheted switch shaft (not shown) which can assume any of ten positions corresponding to each of contacts 1–10 on each deck, so that each common terminal on each deck will be connected to a corresponding contact on each deck. For example, when the switch shaft is in its first position, common terminal 51c will be connected to contact 51-1, common terminal 52c will be connected to contact 52-1 and so forth. When the switch shaft is turned, each common terminal advances to the next corresponding contact on its respective deck. Thus, when the switch shaft is turned to its next position, common terminal 51c will be connected to contact 51-2, common terminal 52c will be connected to contact 52-2 and so on. The switch shaft is turned by the action of a stepper solenoid having coil 59c and switch 59s, which advances the switch shaft by one position each time current is applied to it. Current must be withdrawn from the stepper solenoid coil 59c before it can advance the switch shaft further.

Having explained the operation of the stepper switch, the control circuit is most easily described by beginning with the configuration of the system when the level of salt solution in mixing tank 12 is above batch level 38 but below water cut off level 40. The system is then most easily understood by following the system as it progresses through a complete cycle.

When the level of salt solution is above batch level 38 but below water cutoff level 40, normally closed batch level pressure switch 56 is open and normally closed low level alarm switch 58 is open, while normally open high level alarm switch 60 and normally open water cutoff switch 62 are both open. The stepper switch is in the first position so common terminal 51c is connected to contact 51-1, common terminal 52c is connected to contact 52-1 and common terminal 54c is connected to contact 54-1. Since nothing is connected to contact 53-1, this part of the circuit is not in use. If a user wishes to withdraw solution from tank 12, he selects which dye mixing tank 34a, 34b, 34c... he desires by setting selector switch 64 to the appropriate position. For example, if he wishes to add solution to tank A, he sets selector switch 64 to position A. He then sets the number of gallons of solution that he wishes to withdraw on counter 66 which is connected to flowmeter 68. Counter switch 66s is normally open but closes when counter 66 is activated and remains closed until the set number of gallons have flown through flowmeter 68. Flow is initiated by closing normally open switch 70 which activates metering enabling relay coil 72c closing normally open metering enabling relay switches 72s1 and 72s2. Since metering enabling relay switch 72s1 is in series with metering enabling relay coil 72c current flows through relay coil 72c and counter switch 66s until counter switch 66s opens after the required amount of solution has been withdrawn.

Current flows through switch 76s2 and through normally closed low level alarm switch 74s, through common terminal 54c to contact 54-1, simultaneously causing four events to occur. Batch delay relay coil 76c is energized, solenoid 78 is energized thereby closing valve 36, the selected mixing tank valve solenoid coil 78a, 78b, 78c... is energized thereby opening the selected mixing tank valves 34a, 34b, 34c..., and metering pump relay coil is energized by current flowing through diode 80 and normally open mixer relay switch 55s is closed. Mixer relay coil 55c is energized since common terminal 51c is connected to contact 51-1. When batch delay relay coil 76c is energized, batch delay relay switch 76s opens and remains open until the delivery is complete.

If this delivery should withdraw fluid below batch level 38, normally closed batch level switch 56 closes but nothing happens until the delivery is complete since batch delay relay switch 76s is open. When counter switch 66s opens, meter enabling relay coil 72c is de-energized, which opens meter enabling relay switch 72s2 de-energizing batch delay relay coil 76c closing normally closed batch delay relay switch 76s. When both batch level switch 56 and batch delay relay switch 76s have closed, current flows through them, through contact 52-1 to common terminal 52c energizing step stepper relay coil 86c closing normally open step stepper relay switch 86s. Since stepper relay coil 92c is energized, normally open stepper relay switch 92s1 is closed, therefore current will flow through normally closed alarm relay switch 88s1 through coil 59c of the stepper solenoid which causes the stepper to advance to position 2 and opens normally closed stepper solenoid switch 59s just as the stepper completes its motion.

When the stepper solenoid switch opens, the current through stepper relay coil 92c is interrupted opening normally open stepper relay switches 92s1 and 92s2. Since the stepper switch has advanced one position contact 52-2 is now connected to common terminal 52c but since the level of solution is beneath the water cutoff level, water cutoff switch 62 is open and step stepper relay coil 86c is de-energized, opening step stepper relay switch 86s which causes the stepper solenoid coil to be de-energized closing the normally closed stepper solenoid switch thereby re-energizing stepper relay coil 92c and closing stepper relay switch 92s1. The system is now in the second state and the shaft will not advance until stepper solenoid coil 59c is again energized.

Register 94 is provided to allow the stepper solenoid coil to remain energized without overheating after stepper relay switch 92s1 opens.

After the system leaves state 1, since contact 54-1 is no longer connected to common terminal 54c, it is not possible to dispense solution since there is no current flow to batch delay relay coil 76c, solenoids 78, 78a, 78b, 78c... or to metering pump relay coil 84c.

If for some reason, the system fails to advance to the second state and solution is withdrawn below low level 39, low level warning switch 58 will close activating low level relay coil 74c opening low level alarm relay switch 74s thereby preventing withdrawal of further solution until the problem is remedied.

Returning now to normal operation, since the stepper switch is now in the second position, common terminal 53c is now connected to contact 53-2 allowing current to flow through normally closed water cutoff relay switch 100s, through alarm relay switch 88s2 thereby activating solenoid 98 which opens valve 16 allowing water to flow into tank 12 through line 14. In state 2, mixer 15 is turned off since nothing is connected to contact 51-2. The system remains in state 2 with water running into the tank until the level reaches water cutoff level 40 at which time normally open water cutoff level switch 62 closes energizing water cutoff relay coil 100c opening normally closed water cutoff relay switch 100s deactivating solenoid 98 thus closing valve 16. Should water continue to run into tank 12 for some reason, normally open high level alarm switch 60 will close when the water level reaches high alarm level 41 at which time alarm relay coil 88c will be energized opening normally closed alarm relay switches 88s1 and 88s2 thereby de-energizing solenoid 98 and closing valve 16. Returning now to the normal operation of the system, when the level reaches water cutoff level 40 and water cutoff switch 62 closes current flows through contact 52-2 to common terminal 52c thereby energizing step stepper relay coil 86c which closes step stepper relay switch 86s energizing stepper solenoid coil 59c advancing the stepper switch to position 3 then opening normally closed stepper solenoid switch 59s interrupting the current through stepper relay coil 92c thereby opening normally open stepper relay switch 92s1. Since the stepper has advanced to position 3, contact 52-3 is connected to common terminal 52c but differential pressure switch 110 is open because the pressure difference between sensors 25 and 27 is less than the pressure which corresponds to a full strength solution, therefore step stepper relay coil 86c is de-energized, opening step stepper relay switch 86s removing the current from stepper solenoid coil 59c thereby closing stepper solenoid switch 59s and energizing stepper relay coil 92c and closing stepper relay switch 92s1.

Since the stepper is now in the third position, common terminal 53c is connected to contact 53-3 allowing current to flow through normally closed solution strength relay switch 104s, through normally closed alarm relay switch 88s3 thereby energizing salt conveyor relay coil 106c which activates motor 128 driving conveyor 24 thereby delivering salt 20 to tank 12. Mixer 15 is activated since common terminal 51c is now connected to contact 51-3 since the stepper is in the third position thus mixer relay coil 55c is energized thereby activating mixer 15. As conveyor 24 operates, salt 20 goes into solution or suspension in tank 12 thereby increasing the difference between the pressures measured by sensors 25 and 27 which are connected to pressure differential switch 110 which is open until the pressure difference between sensors 25 and 27 reaches a predetermined setting which corresponds to the desired concentration at which time it closes.

When pressure differential switch 110 closes, solution strength relay coil 104c is energized thereby opening normally closed solution strength relay switch 104s de-energizing salt conveyor relay coil 106c which stops conveyor 24 thus stopping introduction of salt 20 into tank 12.

When salt conveyor relay coil 106c is energized, conveyor delay relay coil 107c is simultaneously energized. If current to conveyor delay relay coil is not interrupted within 30 minutes by the stepper moving to position 4 conveyor delay relay switch 107s closes thereby activating alarm relay 88c which sounds an external alarm (not shown) and opens alarm relay switches 88s1, 88s2 and 88s3. Thus, conveyor 24 is stopped since conveyor relay coil 106c is de-energized when switch 88s3 opens. Further, solution cannot be withdrawn since the system is prevented from advancing to state 1.

When differential pressure switch 110 closes, step stepper relay coil 86c is energized thereby stepping the stepper to position 4 as described above. In position 4, common terminal 53c is connected to contact 53-4 allowing current to flow through mixing delay relay coil 108c which causes normally open mixing delay relay switch 108s to close after a pre-determined time has elapsed. When mixing delay relay switch 108s closes current flows through contact 52-4 to common terminal 52c actuating step stepper relay coil 86c causing normally open step stepper relay switch 86s to close thereby allowing current to flow through stepper solenoid coil 59c causing the stepper to advance to position 5 and causing normally closed stepper solenoid switch 59s to open, interrupting the current through stepper relay coil 92c which opens stepper relay switches 92s1 and 92s2 which deactivates step stepper relay coil 86c interrupting the current through stepper solenoid coil 59c allowing the solenoid to return to its starting position. When stepper solenoid coil 59c is de-energized, stepper solenoid switch 59s closes reactivating stepper relay coil 92c closing stepper relay switches 92s1 and 92s2. Since contacts 52-5, 52-6, 52-7, 52-8, 52-9 and 52-10 are all connected together current still flows through step stepper relay coil 86c causing the stepper to advance in sequence to positions 6, 7, 8, 9, 10 and finally to position 1 in the manner described above. When the stepper switch reaches position 1, step stepper relay coil 86c is de-energized causing the stepper switch to remain in positon 1. The system has now returned to state 1 and salt solution may be withdrawn by setting counter 66 and closing metering switch 70 as has been previously described.

Intermittent timer 120 is provided to intermittently cycle solution through line 26. Timer 120 is normally open, but closes for ten (10) minutes every four (4) hours thereby activating metering pump relay coil 84c activating metering pump 79. Since valve 36 is normally open, solution circulates through line 26 keeping it open.

Arc suppressor diodes 121, 122 and 123 are provided to suppress arcing at the switch which de-energizes the coil. Diodes 124 and 125 are provided to allow more than one source of current to activate alarm relay coil 88c without activating improper parts of the circuit.

As our invention, we claim:

1. The method of automatically maintaining a supply of salt solution of a pre-determined concentration in a holding tank which supplies salt solution to a plurality of containers comprising the steps of: providing a salt solution of a pre-determined concentration in a holding tank, periodically supplying salt solution from the holding tank to one or more containers, sensing the level of salt solution in the holding tank as it is being supplied to said containers, continuing to supply said containers with salt solution after a pre-determined low level of solution has been sensed, stopping the supply of salt solution to said containers when they have been filled after the low level of solution has been sensed in said holding tank, supplying water into the holding tank after the supply of solution to the containers has been terminated, sensing the high level of solution in the holding tank and then stopping the supply of water thereto, supplying salt into the holding tank after the supply of water has been stopped and stopping the supply of salt to said holding tank when the specific gravity of the solution has reached a pre-determined value.

2. The method of claim 1 wherein the specific gravity of the solution is measured by measuring different levels of pressure in the holding tank.

* * * * *